United States Patent [19]

Leopold, Jr. et al.

[11] 3,882,884
[45] May 13, 1975

[54] TAMPERPROOF OPEN BOTTOM STOP ASSEMBLIES

[75] Inventors: Wilbur R. Leopold, Jr.; Carl E. Floren, both of Decatur; William L. Hauffe, Warrensburg, all of Ill.

[73] Assignee: Mueller Co., Decatur, Ill.

[22] Filed: Dec. 4, 1973

[21] Appl. No.: 421,727

[52] U.S. Cl. ................ 137/327; 137/383; 251/160; 251/309
[51] Int. Cl. ............................................ F16k 39/00
[58] Field of Search ............. 137/75, 315, 317, 320, 137/323, 327, 328, 383, 384; 251/160, 164, 161, 158, 304, 309, 317

[56] References Cited
UNITED STATES PATENTS

| | | | |
|---|---|---|---|
| 1,333,309 | 3/1920 | Hause | 137/384 |
| 2,653,790 | 9/1953 | Bowan et al. | 251/317 |
| 2,664,263 | 12/1953 | Stadler | 251/309 X |
| 3,467,356 | 9/1969 | Mueller | 137/384 |

*Primary Examiner*—Martin P. Schwadron
*Assistant Examiner*—David R. Matthews
*Attorney, Agent, or Firm*—Cushman, Darby & Cushman

[57] ABSTRACT

A tamperproof open bottom stop is disclosed which includes a housing having a circular tapered valve seat with at least one fluid flow passage therethrough. A tapered plug or key member is positioned in the valve seat and is rotatable with respect thereto. The plug has a flow passage therethrough which is movable into and out of registration with the flow passage of the housing to open and close the valve. A means for maintaining the tapered plug tightly seated against the tapered valve seat is provided in the form of a nut threaded about an axial extension of the tapered plug. Thus, when the nut is tightened around the stop housing, the plug is pulled inwardly into the valve seat to thereby provide a tight interface between the plug and the valve seat. A protective cap is placed over the end of the tapered plug and is secured thereto by means of a tamperproof screw which is threaded into the end of the plug. The threads of the tamperproof screw are left-handed as opposed to the right-handed threads of the axial extension of the plug, thereby preventing the nut from being turned in a direction which will loosen the tapered plug but permitting the nut to be rotated in the opposite direction so as to tighten the plug against the valve seat.

10 Claims, 3 Drawing Figures

TAMPERPROOF OPEN BOTTOM STOP ASSEMBLIES

BACKGROUND OF THE INVENTION

This invention relates to a tamperproof open bottom stop valve assembly.

Open bottom stops of the type contemplated in the instant invention are commonly used in supply lines for fluids, such as domestic gas and water. The valves are usually connected into a line ahead of the gas meter and sometimes are outside of the dwelling to which the gas or water is being supplied. Valves thus employed are commonly referred to as meter stops although it should be realized that the invention is applicable to valves adapted for other uses. It is highly desirable that the valve plug of a meter stop be easily movable between its open and closed position without impairment of its sealing function. However, it is also highly desirable that unauthorized disassembly or tampering with a meter stop be prevented. Thus in the past, experience has shown that valve plugs sometimes are tampered with by removing the plug retaining means, thereby permitting the valve plug to be removed from its seat and hence removed from the stop assembly. Such unauthorized disassembly not only may result in damage to the valve assembly and thus impair its subsequent operation but also results in fluid leakage which may result in an explosion in the case where gas is being supplied and in addition permits the bypassing of the meter.

Prior efforts have been made to render meter stops tamperproof so that they cannot be disassembled with conventional tools such as, for example, wrenches and pliers, typically available to a householder. These prior art efforts however have frequently resulted in relatively complicated and cumbersome valve connections which are both costly to produce and difficult to adjust. Thus, in one of the early developments, as illustrated in Hause U.S. Pat. No. 1,333,309, a pair of cover plates were positioned over each end of a cock seal. Each cover included an apertured lug through which a wire could be threaded. A single wire was then threaded through the apertured lugs in the covers and in addition through apertured lugs connected to the valve housing. The wire was then terminated in a lead seal. When the valve was to be opened, the lead seal had to be broken before the caps or covers could be removed to expose the operational portion of the valve. This invention had the drawback that the locking means, i.e., the wire, could be easily cut and the valve opened or tampered with. Thus, all that the sealing means provided was an indication to authorized personnel that the valve had been opened or tampered with. Such an arrangement is of little value today where several weeks or even months go by between the times that the stop valves are checked by authorized personnel.

Mara U.S. Pat. No. 1,549,322 and Benaggio U.S. Pat. No. 2,033,371 disclose sealing means utilizing a cap positioned about a lock nut which secures a valve plug in position in a valve housing. The cap has a plurality of holes through which a wire is threaded with the wire terminating in a lead seal. In each case the lock nut cannot be accessed unless the wire is removed. Thus, when the cap is to be removed from the valve to permit access to the lock nut, the lead seal must be broken, thereby providing an indication that the valve has been tampered with. However, these arrangements have the same shortcomings as the aforementioned Hause development since the wire can easily be cut or broken and the valve tampered with long before an authorized person inspects the valve assembly.

More recently, as disclosed in Bowan et al. U.S. Pat. No. 2,653,790 which patent is assigned to the common assignee herewith, a tamperproof valve was provided wherein a tapered plug having a through passageway was positioned in a valve seat. The tapered plug had a relatively long axial extension, a portion of which was threaded so that a nut could be tightened thereabout to secure the tapered plug in position against the valve seat. A locking pin was inserted into a blind hole which extended through the unthreaded portion of the axial extension of the tapered plug and through a portion of a key washer positioned thereabout to thereby prohibit axial movement of the plug with respect to the valve seat. A similar concept was disclosed in U.S. Pat. Nos. 3,333,812 and 3,467,356 issued to Mueller, each of which is also assigned to the common assignee herewith. These tamperproof arrangements, while preventing one from removing the plug from the valve housing, do not permit easy adjustment of the tapered plug with respect to the valve housing. In addition, the prior art tamperproof valves required an extra amount of brass in the tapered plug in order to provide a shank portion into which a pin and over which a washer could be positioned.

It therefore is an object of this invention to provide an improved tamperproof open bottom stop valve arrangement.

SHORT STATEMENT OF THE INVENTION

Accordingly, applicants have provided a tamperproof open bottom valve which includes a housing member having a circular tapered valve seat provided with at least one flow passage therethrough. A tapered plug member is rotatable in the valve seat and has a flow passage therethrough which is movable into and out of registration with the flow passage of the housing to open and close the valve, respectively. A stem portion of the tapered plug extends downwardly through the housing and has a threaded portion for receiving a lock nut. When the nut is threaded onto the stem and against the valve housing, the tapered plug is pulled downwardly into the valve seat to provide a tight interface between the plug and the seat. A protective cover or cap is positioned over the valve stem and either over or against the locking nut with the cover cap being secured to the stem by means of a tamperproof screw threaded into a hole in the end of the plug stem. The protective cap is positioned against the lock nut with the lock nut and valve stem having mating right-handed threads while the tamperproof screw and hole in the end of the stem having mating left-handed threads. Thus, any attempt to turn the nut so as to loosen the tapered plug results in a tightening of the cover cap against the nut which thereby inhibits further movement of the nut with respect to the valve stem. On the other hand, the nut can be turned in the opposite direction to thereby tighten the tapered plug against the valve seat such as may be necessary as the plug wears with continued use.

In another embodiment of the invention, the tapered plug is secured against the valve seat by means of a protective cap which is secured to the end of the stem of the plug by means of a tamperproof screw. Thus the plug cannot be removed from the valve seat since the tamperproof screw cannot be withdrawn from the plug. However, the plug can be adjusted with respect to the valve housing by further threading the screw into the stem of the plug.

BRIEF DESCRIPTION OF THE DRAWINGS

Other objects, features and advantages of the present invention will become more fully apparent from the following detailed description, appended claims and the accompanying drawings in which:

DETAILED DESCRIPTION OF THE PREFERRED EMBODIMENT

Figure 1:
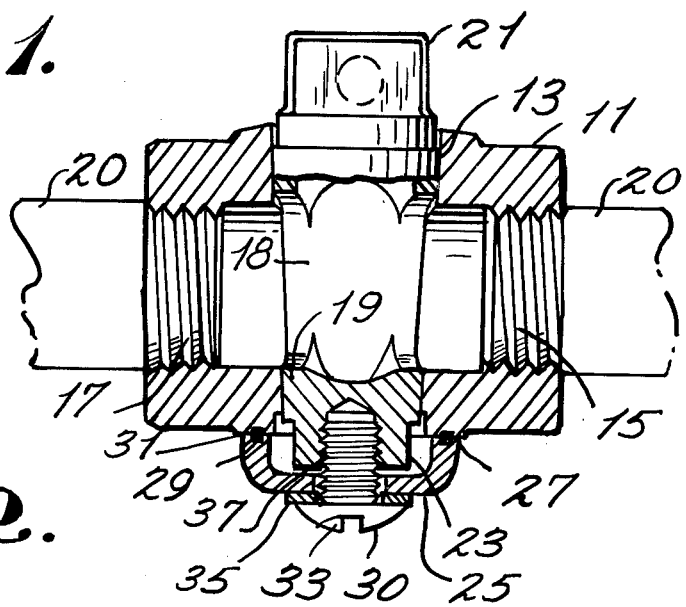
FIG. 1 is a section view of the tamperproof open bottom stop of the present invention.

Refer now to FIG. 1 where there is disclosed an open bottom stop arrangement including a housing 11 which is provided with a conical tapered valve seat 13 having diametrically opposed inlet and outlet ports 15 and 17, respectively. The ports 15 and 17 may be interiorly threaded at their outer ends as shown for connecting the valve into a line 20 or may be provided with any other connecting means well known in the art. Rotatably mounted in the valve seat 13 is a correspondingly tapered valve plug 19. The valve plug 19 may be either a solid member or a hollow shell member and is formed with a port or through passageway 18 which is adapted to register with the ports 15 and 17 of the housing 11 when the valve is in the open position. The plug 19 has a key portion 21 for rotating the plug by means of a suitable tool such as a pliers or wrench. At the opposite narrow end of the plug, a stem 23 extends through the housing 11 and has an axially oriented tapped hole 37 therein. A protective cap 25 is positioned over the plug stem and bears against surface 27 of the stop housing 11. The protective cap has a groove 29 in its end surface and a resilient seal 31, such as an O-ring, is positioned in the groove to provide a seal between the stop housing 11 and the protective cap 25. This prevents the fluid passing through the stop from leaking out and in addition prevents outside moisture from entering the stop assembly. The protective cap has a hole through its center through which the stem of a conventional tamperproof screw 30 extends. Examples of known tamperproof screws are disclosed in Salmen U.S. Pat. No. 1,956,963; Webb U.S. Pat. No. 2,133,409; and Hewitt U.S. Pat. 2,362,999. Typically a tamperproof screw includes a cut-away kerf portion 33 so that once the screw is threaded into position, the screw cannot thereafter be removed by means of conventional household tools. A friction washer 35 is positioned between the head of the screw 30 and the protective cap 25. The washer 35 provides a seal between the cap 25 and the screw 30 to prevent the fluid passing through the stop from leaking out and prevents outside moisture from entering as well as a relatively low friction interface between the cap 25 and the screw 30 so that when the key 21 is rotated to thereby rotate the tapered plug, the screw 30 will rotate along with the plug and with respect to the stationary protective cap 25. Thus continual rotation of the tapered plug 19 will not result in the screw 30 working loose from the tapped bore 37 in the stem of the plug 19.

This tamperproof open bottom stop assembly is a substantial simplification over the prior art since all that is required is a protective cap which is secured to the end of the valve stem by means of a tamperproof screw and a friction washer so as to permit the rotation of the tapered plug with respect to the valve housing and the protective cap. The screw cannot be turned so as to free the screw from the plug but can be rotated in the opposite direction to pull the plug downward into the valve seat 13. Thus, the open bottom stop assembly can be readily adjusted as the tapered plug wears with use while at the same time an unauthorized person cannot access the tapered plug so as to remove it from the housing 11 since the screw will not turn in the opposite direction.

Figure 2:
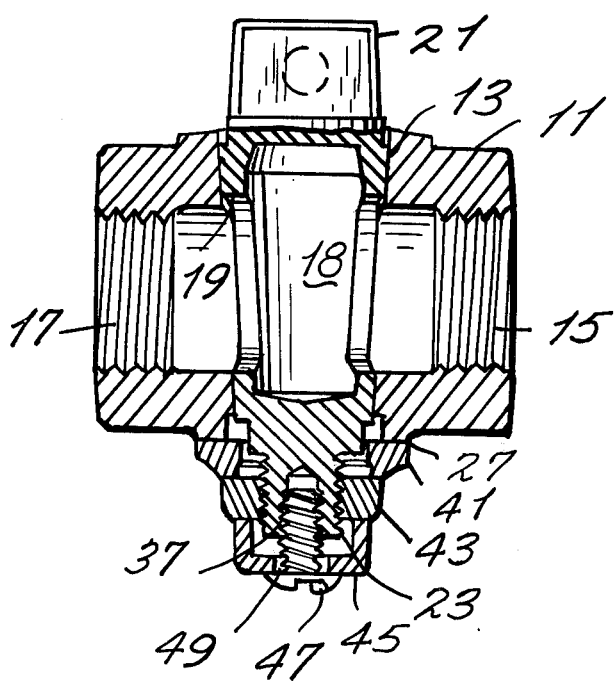
FIG. 2 is a section view of another alternate embodiment of the open bottom stop of the present invention wherein right-handed and left-handed threads are utilized to provide a tamperproof locking arrangement.

Refer now to FIG. 2 where an alternate embodiment of the invention is illustrated. A valve housing 11 is shown having a tapered valve seat 13 with diametrically opposed inlet and outlet ports 15 and 17, respectively. As in the case of the embodiment of FIG. 1, the ports 15 and 17 may be interiorly threaded at their outer ends as shown for connecting the valve to a line or may be provided with any other connecting means such as known in the art. Rotatably mounted in the valve seat 13 is a correspondingly tapered metal valve plug 19. The valve plug 19 may be either a solid member or a hollow shell member and is formed with a diametric port or passageway 18 therethrough which is adapted to register with the ports 15 and 17 when the valve is in the open position. The tapered plug also includes a key 21 for rotating the plug with respect to the housing. At the opposite narrow end of the tapered plug is a stem 23 which is threaded with righthand threads. An axial bore 37 through the end of the stem is tapped with left-hand threads. A washer 41 is positioned over surface 27 of the stop housing 11. Threaded onto the stem 23 is a lock nut 43 which, when tightened, bears against the washer 41 to thereby pull the tapered plug into the seat 13 in the housing 11. With the tapered plug in position, a protective cap 45 is positioned over the end of the stem 23 and against the top surface of the lock nut 43. A left-handed screw 47 of the tamperproof type is inserted through a hold 49 in the end of the protective cap 45 and is threaded into the tapped bore 37 in the stem 23 until the cap is pressed tightly against the bottom of the lock nut 43.

In order to remove the tapered plug 19 from the housing 11, the nut 43 has to be removed. However, since the nut 43 and stem 23 have mating right-handed threads, rotation of the nut 43 would cause screw 47 to tighten in the tapped bore 22. Accordingly, further rotation of the nut 43 would be prevented. However, the nut 43 can be turned in the opposite direction so as to tighten the plug against the valve seat 13. Thus, since the tamperproof screw 47 cannot be removed by typical or conventional tools and since the lock nut 43 cannot be removed from the valve stem 23, a tamperproof open bottom stop valve arrangement is provided which is not only simple in structure but also convenient to adjust.

Figure 3:
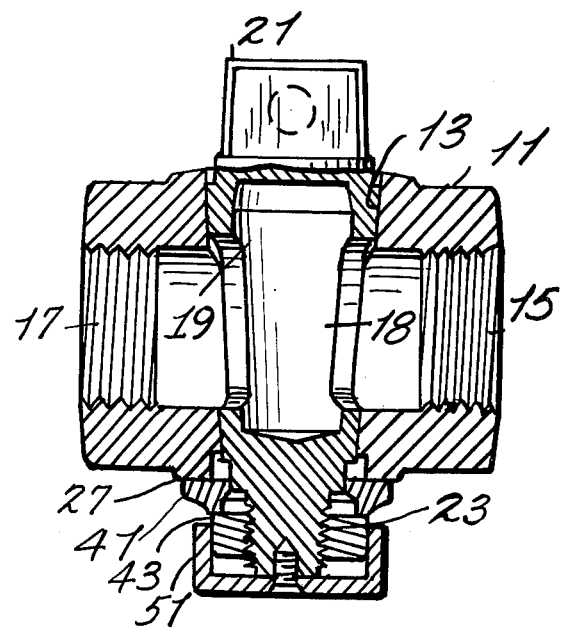
FIG. 3 is a section view of yet another embodiment of the tamperproof open bottom stop assembly of the present invention.

Refer now to FIG. 3 which is another alternative embodiment of the present invention. An open bottom stop is disclosed having a housing 11 provided with a tapered valve seat 13 having diametrically opposed inlet and outlet ports 15 and 17, respectively. The ports 15 and 17 may be interiorly threaded at their outer ends as illustrated for connecting the valve into a line or may be provided with any other connecting means known in the art. Rotatably mounted in the valve seat 13 is a correspondingly tapered metal valve plug 19. The valve plug 19 may be either a solid member or a hollow shell member and is formed with a through passageway 18 which is adapted to register with the ports 15 and 17 when the valve is in the open position. The tapered plug 19 includes a key 21 which is adapted to rotate the plug with respect to the housing 11 when engaged by a suitable tool, such as a pliers or wrench. The opposite end of the tapered plug includes a valve stem 23 which is threaded for receiving a lock nut 43. A washer 41 is positioned over a bearing surface 27 of the housing as illustrated. The lock nut 43 is then threaded onto the stem 23 until the nut bears against the washer 41 in the housing 11. This forces the tapered plug 19 to seat tightly against the tapered valve seat 13. A protective cap 51 is positioned over the lock nut 43 and the valve stem 23 and secured to the valve stem 23 by means of a tamperproof screw, a drive stud or a locking pin which can be threaded in the case of a tamperproof screw or driven in the case of a drive stud or locking pin into the end of the valve stem 23. The protective cap 51 prevents access to the lock nut 43 to thereby prohibit rotation of the lock nut with respect to the stem 23 and the housing 11. Thus the tapered plug 19 cannot be removed from the seat 13 of the housing 11.

The embodiments of the invention disclosed herein provide a simplified tamperproof open bottom stop assembly which prevents an unauthorized person from removing the tapered plug from the stop and in addition FIGS. 1 and 2 provide an arrangement which can be easily adjusted as the tapered plug wears with use.

The embodiments of FIGS. 2 and 3 can be utilized to modify conventional open bottom stops currently in the field. Thus by appropriately tapping the tapered plug stem 23 as illustrated, a protective cap can be positioned over the stem and a tamperproof screw can be threaded into the tapped bore in the stem to thereby provide a tamperproof open bottom stop. The only operational steps required in the field are boring and tapping the plug stem and then securing the protective cap to the stem by means of a tamperproof screw.

While the present invention has been disclosed with respect to the preferred embodiments thereof, it should be understood that there may be other obvious variances of the present invention which fall within the spirit and scope of the present invention as defined by the appended claims.

What is claimed is:
1. A tamperproof open bottom valve comprising:
   a housing member having a circular tapered valve seat provided with at least one flow passage therethrough,
   a tapered plug member rotatable in said seat and having a flow passage movable into and out of registration with said flow passage of said housing to open and close said valve, respectively,
   means for maintaining said tapered plug tightly seated against said tapered valve seat,
   means for inhibiting the relative movement of said tapered plug and said means for maintaining said tapered plug seated against said valve seat to thereby prevent said maintaining means from being released from said plug, and
   means including said inhibiting means for further moving said tapered plug downwardly against said seat as said plug and said seat wear with use.

2. A tamperproof open bottom valve comprising:
   a housing member having a circular tapered valve seat provided with at least one flow passage therethrough,
   a tapered plug member rotatable in said seat and having a flow passage movable into and out of registration with said flow passage of said housing to open and close said valve, respectively,
   means for maintaining said tapered plug tightly seated against tapered valve seat, and
   means for inhibiting the relative movement of said tapered plug and said means for maintaining said tapered plug seated against said valve seat to thereby prevent said maintaining means for being released from said plug, said maintaining means and said inhibiting means including a protective cap positioned over the end of said tapered plug and against said housing,
   a tamperproof screw threaded into the end of said tapered plug through said protective cap, and a friction washer positioned between said protective cap and the head of said tamperproof screw, said tapered plug and said tamper-proof screw being rotatable with respect to said protective cap and said housing.

3. The tamperproof open bottom valve of claim 2 further comprising means for sealing the end of said tapered plug over which said protective cap is positioned, said sealing means preventing the ingress of moisture and particle matter into said valve and preventing the egress of the fluid being coupled by said valve.

4. The tamperproof open bottom stop of claim 3 wherein said sealing means comprises a groove formed about the end of said sealing cap and a resilient seal positioned in said groove and bearing against said valve housing, and said washer compressed between said sealing cap and said tamperproof screw.

5. In a tamperproof open bottom valve including a housing member having a circular tapered valve seat provided with at least one flow passage therethrough, a tapered plug member rotatable in said seat and having a flow passage movable into and out of registration with said flow passage of said housing to open and close said valve, respectively, said tapered plug having a stem portion at the bottom thereof, and a lock nut threaded over the stem portion of said tapered plug wherein said lock nut and said valve stem have mating right-handed threads, the method of tamperproofing said open bottom valve comprising the steps of boring an axial hole in the end of said stem portion of said tapered valve, tapping a left-handed thread in said bore, positioning a protective cap over the end of said stem portion of said tapered plug and against said lock nut and inserting a left-handed tamperproof screw into said tapped bore to tighten said protective cap against said lock nut wherein rotation of said lock nut in a direction to loosen said nut from said tapered plug results in said left-handed tamperproof screw being threaded further into said tapped bore to thereby prevent further rotation of the lock nut with respect to the tapered plug and wherein when said nut is rotated in the opposite direction said tapered plug is pulled inwardly against said valve seat.

6. In a tamperproof open bottom valve including a housing member having a circular tapered valve seat provided with at least one flow passage therethrough, a tapered plug member rotatable in said seat and having a flow passage movable into and out of registration with said flow passage of said housing to open and close said valve respectively, said tapered plug member having a bottom stem portion, a lock nut threaded over said stem to thereby tightly secure said tapered plug in said housing, the method of tamperproofing said open bottom valve comprising the steps of boring an axial hole in the end of the said stem portion of said tapered plug, tapping said bore, positioning a protective cap over said stem and said lock nut, and securing said protective cap to said stem by a securing means threaded into said tapped bore.

7. The method of claim 6 wherein said protective cap is secured to said stem portion of said tapered plug by means of a tamperproof screw.

8. The method of claim 6 wherein said protective cover is secured to said stem portion of said tapered plug by means of a drive stud.

9. A tamperproof open bottom valve comprising:
 a housing member having a circular tapered valve seat provided with at least one flow passage therethrough,
 a tapered plug member rotatable in said seat and having a flow passage movable into and out of registration with said flow passage of said housing to open and close said valve, respectively,
 means for maintaining said tapered plug tightly seated against said tapered valve seat, said maintaining means including a lock nut threaded over the stem portion of said tapered plug, said lock nut and said valve stem having right-handed threads, and
 means for inhibiting the relative movement of said tapered plug and said means for maintaining said tapered plug seated against said valve seat to thereby prevent said maintaining means from being released from said plug, said inhibiting means and said maintaining means including a protective cap positioned over the end of said stem and against said lock nut, and a tamperproof screw positioned through a hole in said protective cap and threaded into the bore at the end of said tapered plug, said tamperproof screw and said bore having left-handed threads wherein when said lock nut is rotated to free the nut from the stem the left-handed tamperproof screw is threaded further into said bore to thereby prevent further rotation of the lock nut with respect to the tapered plug and wherein when said nut is rotated in the opposite direction, said tapered plug is pulled inwardly against said valve seat.

10. A tamperproof open bottom valve comprising:
 a housing member having a circular tapered valve seat provided with at least one flow passage therethrough, a tapered plug member rotatable in said seat and having a flow passage movable into and out of registration with said flow passage of said housing to open and close said valve, respectively,
 means for maintaining said tapered plug tightly seated against said tapered valve seat, maintaining means including a valve stem portion of said tapered plug, and a lock nut threaded over said stem to thereby tightly secure said tapered plug in said housing, and
 means for inhibiting the relative movement of said tapered plug and said means for maintaining said tapered plug seated against said valve seat to thereby prevent said maintaining means from being released from said plug, said inhibiting means and said maintaining means further including a protective cover positioned over said lock nut and said tapered plug stem, said protective cover being fixedly secured to said stem by means fo a one way connection, said one way connecting means prohibiting the release of said cap from said valve stem.

* * * * *